US006599049B2

United States Patent
Erben

(10) Patent No.: US 6,599,049 B2
(45) Date of Patent: Jul. 29, 2003

(54) INDICATING INSTRUMENT

(75) Inventor: Thomas Erben, Eichberg (CH)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/778,025

(22) Filed: Feb. 5, 2001

(65) Prior Publication Data

US 2001/0024363 A1 Sep. 27, 2001

(30) Foreign Application Priority Data

Feb. 10, 2000 (DE) ......................... 100 05 993

(51) Int. Cl.⁷ ................................. B25G 3/00
(52) U.S. Cl. ......................... 403/27; 73/493; 403/329; 116/62.1; 248/27.1
(58) Field of Search ................. 403/187, 188, 403/194, 199, 201, 230, 247, 252, 256, 257, 259, 261, 288, 326, 329, 374.2, 373, 27; 73/493, 491; 116/62.1, 62.4, 284, 285, 305; 248/27.1, 27.3; 340/461; 411/338, 339, 427, 437, 433

(56) References Cited

U.S. PATENT DOCUMENTS

| | | | | |
|---|---|---|---|---|
| 1,330,673 A | * | 2/1920 | Anderson | 411/339 |
| 3,603,228 A | * | 9/1971 | Kremp et al. | 200/61.85 |
| 4,033,191 A | * | 7/1977 | Kreuz et al. | 73/431 |
| 4,050,307 A | * | 9/1977 | McMullen et al. | 73/335.14 |
| 5,588,329 A | * | 12/1996 | Nedachi | 403/326 |
| 5,678,953 A | * | 10/1997 | Usui et al. | 359/819 |
| 5,960,837 A | * | 10/1999 | Cude | 137/205 |
| 6,123,492 A | * | 9/2000 | Pickard | 411/339 |
| 6,162,234 A | * | 12/2000 | Freedland et al. | 411/344 |
| 6,361,260 B1 | * | 3/2002 | Schirrmacher | 411/267 |
| 2001/0011816 A1 | * | 8/2001 | Suzuki et al. | |

FOREIGN PATENT DOCUMENTS

DE 0131739 A1 * 6/1984 ........... F16B/29/00

* cited by examiner

Primary Examiner—Lynne H. Browne
Assistant Examiner—Jori Schiffman
(74) Attorney, Agent, or Firm—Martin A. Farber

(57) ABSTRACT

An indicating instrument (4) has a housing (3) having an external thread (7) by which it can be inserted in a recess (2) of a dashboard (1). A housing nut (9) which can be screwed onto the external thread (7) and has an internal thread (8) fixes the housing (3) on the dashboard. Either the external thread (7) and the internal thread (8) are provided only in at least two subregions of the circumference of the housing (3) and of the housing nut (9), respectively, the subregions each having a shorter length than the subregions which lie between them and do not have a thread, so that the housing nut (9) can be pushed in at least one angular position completely onto the housing (3) without engaging in the external thread (7), or instead only the external thread (7) or the internal thread (8) is provided in at least two subregions of the circumference, which subregions are of resilient design radially, so that the internal thread (8) and external thread (7) can become disengaged.

10 Claims, 1 Drawing Sheet

INDICATING INSTRUMENT

FIELD AND BACKGROUND OF THE INVENTION

The invention relates to an indicating instrument which can be inserted by means of a housing having an external thread into a recess in a dashboard and can be fixed on the dashboard, in particular of a vehicle, by means of a housing nut which can be screwed onto the external thread and has an internal thread.

Indicating instruments of the abovementioned type are mainly installed retrospectively into existing dashboards, for example in watercraft, and are generally known. Their housing either has a collar, by means of which it bears from the rear side against the edge of a recess of the dashboard, or else it is provided with a plurality of latches which are able to snap behind this dashboard when the housing is pushed into the recess of the dashboard. The housing nut is then screwed from the front side onto the housing, so that the housing is clamped firmly to the dashboard between the latches and the housing nut. The thread is a flat thread having a small pitch, which is necessary in order to impart the clamping forces via a number of thread turns of the nut and in order to obtain self-locking.

Since such indicating instruments are installed in dashboards which differ in thickness, and in order to compensate for tolerances, in the case of thin-walled dashboards the housing, after being pushed into the dashboard, has to considerably protrude forward out of the dashboard. This leads to many revolutions of the housing nut being necessary in order to tighten the latter, which is costly in terms of time and is perceived as a nuisance.

SUMMARY OF THE INVENTION

The invention is based on the problem of designing an indicating instrument of the type mentioned at the beginning in such a manner that its housing nut can be brought as rapidly as possible into its clamping position on the housing.

According to the invention, this problem is solved in that either the external thread and the internal thread are only provided in at least two subregions of the circumference of the housing and of the housing nut, respectively, subregions without a thread being in each case arranged in the circumferential direction between the subregions having a thread, so that the housing nut can be pushed in at least two angular positions completely onto the housing without engagement in the external thread, or in that only the external thread or the internal thread is provided in at least two subregions of the circumference and these subregions are of resilient design radially in a position in which the internal thread and external thread become disengaged.

This design makes it possible for the housing nut to be able to be pushed axially onto the housing initially without turning it until it is directly in front of the dashboard. Only when it slightly touches the dashboard are the internal thread and external thread brought into permanent engagement, by rotation of the threaded nut, a rotation of a few angular degrees sufficing to produce the required clamping force. If the resilient subregions are provided, these are initially able "to grate" over the other thread as the housing nut is being pushed on. The invention therefore renders the prolonged rotation of the threaded nut superfluous and enables very rapid installation of indicating instruments of this type.

In spite of the extremely short installation time which is possible, the housing nut is able to impart high clamping forces if, according to a development of the invention, the external thread and the internal thread are designed as self-locking flat threads.

An especially rapid installation of the indicating instrument is possible if the housing has latches which, after insertion of the housing into the recess, grip behind the dashboard from the rear side, and in this latched position the external thread protrudes forward out of the recess, and if the housing nut is designed for fastening on this external thread which protrudes forward.

The housing nut can be pushed axially in three different angular positions onto the housing without the thread being in the way here if the external thread and the internal thread are provided in three subregions of the circumference. Sufficiently high forces can be imparted by means of the three threaded regions. Furthermore, a symmetrical application of force is produced.

The radial springing away of the thread as the housing nut is being pushed on axially can be implemented in a particularly simple manner if, according to another advantageous development of the invention, the internal thread is provided on spring tongues which each form a subregion of the outer surface of the housing nut. By means of this embodiment, a particularly slight "grating" of the internal thread over the external thread can be achieved.

The threaded nut is able to produce high clamping forces, without making it harder to push it on axially, if the internal thread and the external thread each have a serrated profile and the respectively horizontal flank of the internal thread and external thread is provided on the side from which the housing nut is screwed onto the housing.

In the clamping position, the housing nut is forcibly secured against working loose if, according to another embodiment of the invention, the internal thread is provided with latching lugs which can be latched into those subregions of the external thread which are not provided with a thread.

In an indicating instrument according to the invention, in which the external thread and the internal thread are provided only in at least two subregions of the circumference of the housing and of the housing nut, respectively, the installation is advantageously particularly simple if the subregions having a thread each have a shorter length than the subregions which lie between them and do not have a thread, with the result that when the parts are joined, the housing nut does not have to be positioned exactly opposite the housing.

According to another advantageous development of the invention, the housing can be inserted from the front into the recess and can be placed with a step against the dashboard, the external thread is arranged in a region of the housing on the rear side of the dashboard, and the housing can be clamped against the step by means of the housing nut. In this case, the housing is screwed against the dashboard from behind with the result that a visually displeasing and space-taking housing nut is not arranged on the front side of the dashboard facing someone looking at it.

Good sealing, which is important particularly in the case of watercraft, between the housing and dashboard can advantageously be achieved if an O-ring can be arranged between the step of the housing and the dashboard. By means of the arrangement of the O-ring and compression thereof during tightening of the housing nut, penetration of moisture into the dashboard is prevented in a simple manner.

BRIEF DESCRIPTION OF THE DRAWINGS

The invention permits various embodiments. To further clarify its basic principle, two of these are illustrated in the drawings and are described below. In the drawings

DETAILED DESCRIPTION OF THE PREFERRED EMBODIMENTS

Figure 1:
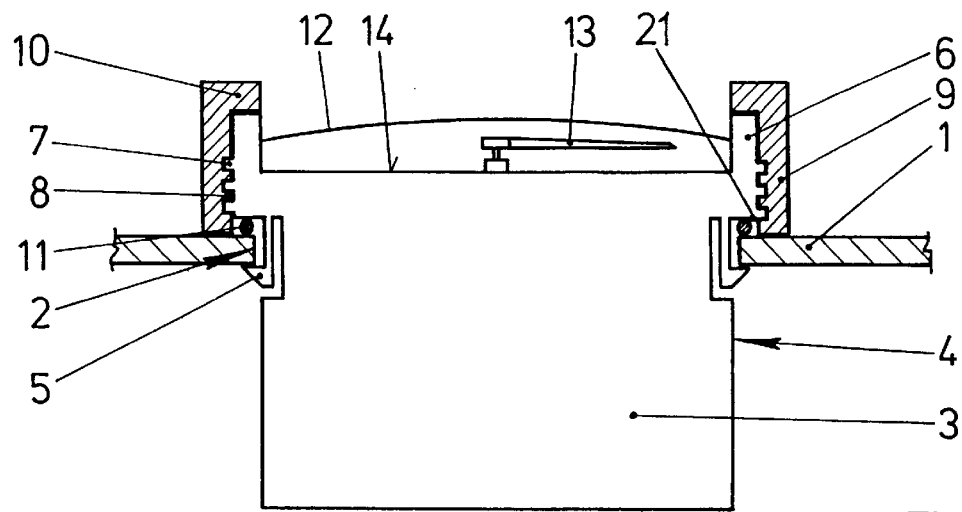
FIG. 1 shows a section through a subregion of a dashboard having the indicating instrument according to the invention.

FIG. 1 shows, in section, a subregion of a dashboard 1 which has a recess 2 in which a housing 3 of an indicating instrument 4 is seated. The housing 3 grips behind the edge of the recess 2 by means of latches 5 and protrudes with an annular region 6 through the recess 2. This annular region 6 has an external thread 7 which engages in an internal thread 8 of a housing nut 9. This housing nut 9 is screwed from the front side of the dashboard 1 onto the annular region 6 of the housing 3 and, by means of a shoulder 10, clamps the housing 3 against the dashboard 1, an O-ring 11 between a step 21 of the housing 3 and the dashboard 1 ensuring sealing.

For overall understanding, FIG. 1 illustrates a pointer 13 of the indicating instrument 4, which pointer is behind a covering glass and can move over a dial face 14.

Figure 2:
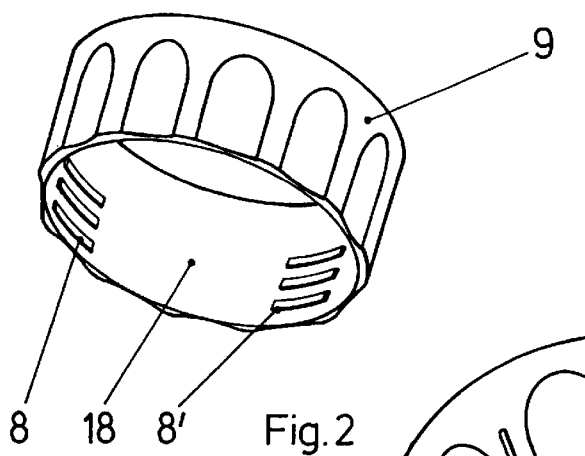
FIG. 2 shows a perspective illustration of a first embodiment of a housing nut according to the invention.

FIG. 2 clarifies the design of the housing nut 9. It can be seen there that the internal thread 8, 8', which is a flat thread having a small pitch, is provided only in three subregions between each of which a subregion 18 without a thread is situated. Accordingly, in this embodiment the external thread 7 which is shown in FIG. 1 is likewise provided only in three subregions. This makes it possible to push the housing nut 9 in three angular positions axially onto the annular region 6 of the housing 3 without in the process disturbing the internal thread 8 or external thread 7. Only when the housing nut 9 actually touches the dashboard 1 is the housing nut 9 rotated and thereby brings the internal thread 8 into engagement with the external thread 7.

Figure 3:
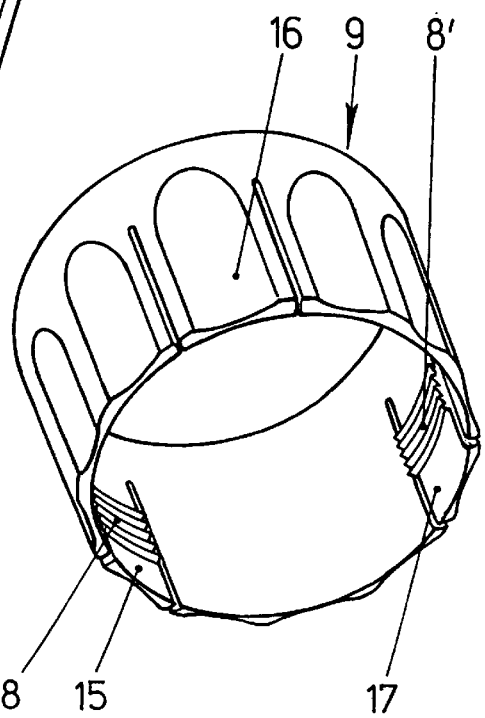
FIG. 3 shows a perspective illustration of a second embodiment of a housing nut.

In the embodiment according to FIG. 3, three subregions of the outer surface of the housing nut 9 are each designed as a spring tongue 15, 16, 17. The internal thread 8, 8' is provided on the inside of these spring tongues 15, 16, 17. Said internal thread in this embodiment is of serrated design so that it is able to slide over the external thread 7 of the annular region 6 of the housing 3 as the housing nut 9 is being pushed on.

Figure 4:
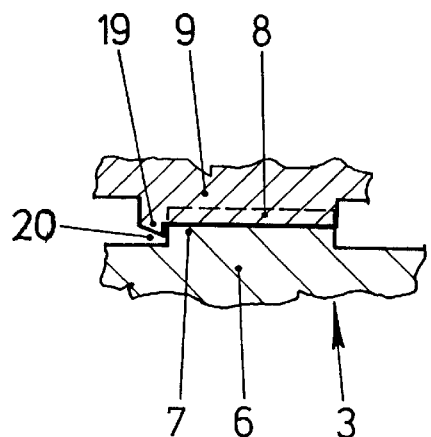
FIG. 4 shows a schematic illustration of a subregion of a thread having latching means.

The illustration according to FIG. 4 shows that a latching lug 19 may be provided in each case at the beginnings of the individual thread turns. If a housing nut 9 is screwed onto the external thread 7 of the annular region 6 of the housing 3, then, at the end of the particular region having an external thread 7, this latching lug 19 snaps into a subregion 20 which does not have a thread, and thereby prevents the housing nut 9 from being able to rotate back.

I claim:

1. An indicating instrument enclosed by a housing having an external thread, wherein the instrument can be inserted by the housing into a recess in a dashboard and can be fixed on the dashboard, in particular of a vehicle, by a housing nut which has an internal thread and which is screwable onto the external thread by engagement with the internal thread, wherein either the external thread (7) and the internal thread (8) are provided only in at least two subregions of the circumference of the housing (3) and of the housing nut (9), respectively, subregions (18, 20) without a thread being in each case arranged in circumferential direction between the subregions haying a thread (7, 8), so that the housing nut (9) is pushable in at least two angular positions completely onto the housing (3) without engagement in the external thread (7), or wherein only the external thread (7) or the internal thread (8) is provided in at least two subregions of the circumference and these subregions are resilient radially in a position in which the internal thread (8) and external thread (7) become disengaged; and wherein the housing (3) has latches (5) which, after insertion of the housing into the recess (2), grip behind the dashboard (1) from a rear side, and in this latched position the external thread (7) protrudes forward out of the recess (2), and wherein the housing nut (9) is adapted for fastening on the external thread (7) and moves towards the latches upon rotation of the internal thread along the external thread, the latches being located between the housing and the nut.

2. The indicating instrument as claimed in claim 1, wherein the external thread (7) and internal thread (8) are self-locking flat threads.

3. The indicating instrument as claimed in claim 1, wherein the external thread (7) and the internal thread (8) are provided in three subregions of the circumference.

4. The indicating instrument as claimed in claim 1, wherein the internal thread (8) is provided on spring tongues (15, 16, 17) which each form a subregion of the outer surface of the housing nut (9).

5. The indicating instrument as claimed in claim 4, wherein the internal thread (8) and the external thread (7) each have a serrated profile and a respectively horizontal flank of the internal thread (8) and external thread (7) is provided on a side from which the housing nut (9) is screwed onto the housing (3).

6. The indicating instrument as claimed in claim 1, wherein the internal thread (8) is provided with latching lugs (19) which are latchable into the subregions (20) of the external thread (7) which are not provided with a thread.

7. The indicating instrument as claimed in claim 1, wherein the external thread and the internal thread are provided only in at least two subregions of the circumference of the housing and of the housing nut, respectively, wherein the subregions having a thread (7, 8) each have a smaller length than the subregions (18, 20) which lie therebetween and do not have a thread.

8. An indicating instrument enclosed by a housing having an external thread, wherein the instrument can be inserted by the housing into a recess in a dashboard and can be fixed on the dashboard, in particular of a vehicle, by a housing nut which has an internal thread and which is screwable onto the external thread by engagement with the internal thread, wherein either the external thread (7) and the internal thread (8) are provided only in at least two subregions of the circumference of the housing (3) and of the housing nut (9), respectively, subregions (18, 20) without a thread being in each case arranged in circumferential direction between the subregions having a thread (7, 8), so that the housing nut (9) is pushable in at least two angular positions completely onto the housing (3) without engagement in the external thread (7), or wherein only the external thread (7) or the internal thread (8) is provided in at least two subregions of the circumference and these subregions are resilient radially in a position in which the internal thread (8) and external thread (7) become disengaged; and wherein the housing (3) is insertable from a front side of the dashboard into the recess (2) and is placeable with a step (21) against a front side of the dashboard (1), wherein latches extend from a side of the housing to engage a back side of the dashboard, the latches being located between the housing and the nut upon engagement of the internal thread of the nut with the external thread of the housing, wherein the external thread (7) is arranged in a region of the housing (3) on the front side of the dashboard (1), and wherein the housing (3) is clampable against the step (21) by the housing nut (9), and the housing nut moves towards the step and toward the latches upon rotation of the internal thread along the external thread.

9. An indicating instrument which can be inserted by a housing having an external thread into a recess in a dashboard and can be fixed on the dashboard, in particular of a vehicle, by a housing nut which is screwable onto the external thread and has an internal thread, wherein either the external thread (7) and the internal thread (8) are only provided in at least two subregions of the circumference of the housing (3) and of the housing nut (9), respectively, subregions (18, 20) without a thread being in each case arranged in circumferential direction between the subregions having a thread (7, 8), so that the housing nut (9) is pushable in at least two angular positions completely onto the housing (3) without engagement in the external thread (7), or wherein only the external thread (7) or the internal thread (8) is provided in at least two subregions of the circumference and these subregions are resilient radially in a position in which the internal thread (8) and external thread (7) become disengaged; and wherein the housing (3) is insertable from a front into the recess (2) and is placeable with a step (21) against the dashboard (1), wherein the external thread (7) is arranged in a region of the housing (3) on a rear side of the dashboard (1), and wherein the housing (3) is clampable against the step (21) by the housing nut (9), and an O-ring (11) is arranged between the step (21) of the housing (3) and the dashboard (1).

10. An indicating instrument for insertion into an aperture of a panel, particularly a dashboard, the instrument including a housing with a rear portion of smaller diameter than a diameter of the aperture to permit insertion of the rear portion of the housing into the aperture, a front portion of the housing having an external thread and a diameter larger than the diameter of the aperture to enable a fixing of the instrument to the panel, wherein the housing has latches that grip behind the panel upon insertion of the instrument into the aperture, the instrument further comprising a housing nut having an internal thread for screwing onto the external thread of the front portion of the housing for tightening the panel between the nut and the latches upon insertion of the instrument into the aperture of the panel, and wherein the housing nut moves towards the latches upon rotation of the internal thread along the external thread; and wherein either the external thread and the internal thread are provided only in at least two sub-regions of the circumference of the housing and of the housing nut, respectively, the two sub-regions being spaced apart by further regions without thread to enable a pushing of the housing nut in at least two angular positions completely onto the front portion of the housing without engagement with the external thread, or wherein only the external thread or the internal thread is provided in at least two sub-regions of the circumference with resiliency radially in a position in which the internal thread and the external thread become disengaged.

* * * * *